(12) United States Patent
Fukunaga

(10) Patent No.: US 6,405,680 B1
(45) Date of Patent: Jun. 18, 2002

(54) LIVESTOCK RAISING FACILITY AND METHOD

(76) Inventor: Isami Fukunaga, 2485, Funatsu-cho, Himeji-shi, Hyogo 679-2101 (JP)

( * ) Notice: Subject to any disclaimer, the term of this patent is extended or adjusted under 35 U.S.C. 154(b) by 0 days.

(21) Appl. No.: 09/719,916

(22) PCT Filed: Jun. 15, 1998

(86) PCT No.: PCT/JP98/02656
§ 371 (c)(1),
(2), (4) Date: Feb. 26, 2001

(87) PCT Pub. No.: WO99/65295
PCT Pub. Date: Dec. 23, 1999

(51) Int. Cl.[7] ................................................. A01K 1/02
(52) U.S. Cl. ..................................................... 119/444
(58) Field of Search ................................ 119/444, 447, 119/450, 451, 516, 520, 14.03, 14.02

(56) References Cited

U.S. PATENT DOCUMENTS

| | | | | |
|---|---|---|---|---|
| 3,685,493 A | * | 8/1972 | Weiland, Jr. | 119/28 |
| 4,187,946 A | * | 2/1980 | Stevenson | 209/674 |
| 4,320,008 A | * | 3/1982 | Kokubo | 119/22 |
| 5,477,654 A | * | 12/1995 | Weelink | 119/28 |
| 5,662,068 A | * | 9/1997 | Childs | 119/451 |
| 5,817,241 A | * | 10/1998 | Brayboy | 119/451 |
| 6,136,185 A | * | 10/2000 | Sheaffer | 119/450 |

FOREIGN PATENT DOCUMENTS

| | | |
|---|---|---|
| GB | 1 256 908 A | 12/1971 |
| JP | SHO 60-22171 | 2/1985 |
| JP | 60262539 A | 12/1985 |
| JP | 60262540 A | 12/1985 |
| JP | 06-189688 | 7/1994 |
| JP | 08-009813 | 1/1996 |
| JP | 08-009893 | 1/1996 |

* cited by examiner

Primary Examiner—Thomas Price
(74) Attorney, Agent, or Firm—Marshall, Gerstein, & Borun

(57) ABSTRACT

A livestock raising facility and method permitting labor saving, being free from soil contamination and allowing the flooring material itself to be used as the feed. This facility has a configuration in which each raising space (1) is formed in a rectangular shape as viewed from above, and a partitioning member (3) is attached by a hinge member (hinge metal fitting (7)) to one end of the boundary between each raising space (1) and a paddock (2) formed consecutive to the raising space (1) to swing freely round a vertical axis (7a) from a state in which it provides a partition between the raising space (1) and the paddock (2) to a state in which it provides a partition between the rearing space (1) and an adjoining rearing space (1).

13 Claims, 7 Drawing Sheets

LIVESTOCK RAISING FACILITY AND METHOD

FIELD OF THE INVENTION

The present invention relates to a livestock-raising facility and a raising method which realizes effective raising with less labor force of livestock including pig, cattle, horse, sheep, deer and the like.

BACKGROUND OF THE INVENTION

The present inventor had obtained the Japanese Patent Nos. 1,503,506 and 1,503,507 each of which claims a pig raising system in a fermentation pigsty. Unlike these conventional systems, this system did not need a disposal facility for porcine urine and feces and is excellent in it generate little bad smell and there is little appearance of fly and maggot.

These inventions were epochal in that raw feces can be decomposed and generation of bad smell as well as appearance of fly and maggot may be prevented by excavating its floor to the predetermined depth below the ground level, forming therein a layer of raw dung, flooring on the raw dung material of sawdust, a wood cortex, chaff and the like, and mixing bacteria which promote fermentative decomposition.

Then, they were also excellent in that raising of a pig may be performed with less labor force by employing a self-propelled cutting machine which periodically turns over up and down the flooring material of the pigsty.

With regard to such pigsty, although labor force can be saved by mechanically cutting the flooring material with a self-propelled cutting machine, since manual operation is still necessary to supply feed and to periodical replace the flooring material, there are many aspects to be improved for saving labor force to realize rationalization of raising.

Although such flooring materials themselves are decomposed by fermentation, when care of a underside ground below the flooring material is not enough, maggot will appear, and it will also generate bad smell, and adjustment of humidity In the flooring material will depends on soil quality in the livestock-house.

After the inventors of the aforenoted patents had frustrated to develop the purposed technology, the present inventor obtained the above patents and has established an unique technology which offers cost effectiveness and easy application.

It is therefore an object of the present invention to provide a live stock raising facility and raising method which can save labor force, is free from soil contamination and changes the flooring material into feed by further improving the conventional pig raising system.

DISCLOSURE OF THE INVENTION

In a livestock raising facility wherein a carbon substrate consisting of sawdust, straw, chaff, stick, a wood cortex, woodchip, bark, duct and/or a mixture selected from these materials, which is made to further contain a mixed activated microorganism offering fermentative decomposition action on egesta, is laid on a floor as a flooring material, a raising line is formed by installing a plurality of raising spaces divided into a predetermined area by a partitioning member consecutively, a paddock is formed consecutive to each raising space on the side of the raising space, and a cutting machine agitating the bottom and surface of the flooring material is located to move freely over the above raising line, the livestock raising facility according to the present invention is characterized in that the each raising space is formed in a rectangular shape as horizontally viewed, and the partitioning member is attached by a hinge member to one end of the boundary between each raising space and a paddock formed consecutive to the raising space swing freely round a vertical axis from a state of providing a partition between the raising space and the paddock to that of providing a partition between the rearing space and the adjoining rearing space.

Thus, in accordance with the present livestock raising facility, when the above partitioning member is swung round the vertical axis of the hinge portion in turning over (agitating) a flooring material, a livestock in a raising space is driven therefrom into the paddock themselves by driving a partitioning member. Accordingly, operator may paddock a livestock easily into a paddock without escaping any pig by only swinging the partitioning member round the vertical axis in a short time. Moreover, each adjoining rearing space may be combined into single space along the raising line to turn over by a cutting machine.

Then, in a livestock raising method comprising the steps of laying a flooeing materials containing a carbonen substrate consisting of sawdust, straw, chaff, stick, a wood cortex, woodchip, bark, duct and/or a mixture selected from these materials, which is made to further contain a mixed activated microorganism offering a fermentative decomposition action on egesta being laid on a floor as a flooring material, forming a raising line by installing a plurality of raising spaces divided into a predetermined area by a partitioning member consecutively, forming a paddock consecutive to each raising space on the side of the raising space, forming a feedbox at a side end portion opposite to a raising space of the paddock or a side end portion opposite to the paddock of the raising space, and agitating the flooring material with the cutting machine located to move freely over the raising line, raising a livestock in the raising space, traversing a cutting machine to agitate a flooring material longitudinally along a raising line formed by installing a raising space consecutively which transfer a livestock in each raising space Into the paddock at predetermined intervals, after a new flooring material is formed thereby, a livestock is raised thereon, the livestock raising method according to the present invention is characterized in that the raising space is formed in a rectangular shape as horizontally viewed, one end of a partitioning member used for dividing a raising space from the adjoining rearing space is supported by a hinge member allowing the partitioning member to swing round a vertical axis at the boundary between a raising space and a paddock, a livestock in a raising space is driven into the paddock on the side of the raising space by swinging the partitioning member round the vertical axis of the hinge portion, and the cutting machine is traversed along the raising line as one space formed by installing a raising space consecutively to turn over the flooring material.

Thus, in accordance with this method, when the partitioning member is swung round the vertical axis of the hinge portion in turning over (agitating) a flooring material, a livestock in a raising space is driven therefrom into the paddock by themselves with a partitioning member. Accordingly, the operator may paddock a livestock easily into a paddock without escaping any pig by simply swinging the partitioning member in a short time and flooring material may be turned over with a cutting machine. Moreover, each adjoining rearing space may be combined into single space along the raising line to perform turning over by a cutting machine.

When a hinge member is designed to swing a partitioning member freely round a horizontal axis in the livestock raising facility, even in the case that there are bumps and dips on a floor in a raising space after the turning over (or a flooring material is consciously raised like a mountain), the partitioning member may be swung back to the original state irrelevant to the existence of bumps and dips (or raised sediment like a mountain) after turning it over.

Then, when the foregoing partitioning member is formed by a pale form element, a raising facility has a preferred form to enable it to enhance a ventilation between adjoining raising spaces for improving an environment in the raising space and to watch all raising spaces by operator.

Further, when the foregoing paddock is the substantially same to the raising space, it has a desirous form in raising large livestock such as cattle, horse and the like wherein these livestock may be raised in the paddock substantially similar to the adjoining raising space in performing a turning over operation on one side.

In a livestock raising facility wherein a carbon substrate consisting of sawdust, straw, chaff, stick, a wood cortex, woodchip, bark, duct and/or a mixture selected from these materials, which is made to further contain a mixed activated microorganism offering fermentative decomposition action on egesta, is laid on a floor as a flooring material, a raising line is formed by installing a plurality of raising spaces divided into a predetermined area by a partitioning member consecutively, a paddock is formed consecutive to each raising space on the side of the raising space, and a cutting machine agitating the bottom and surface of the flooring material is located to move freely over the above raising line, when a floor of the livestock raising facility is formed on a concrete foundation and thickness of the flooring material is adjusted to at least 60 cm in a livestock raising facility, permeation of urine and feces from the flooring material into the soil as well as extensive soil contamination thereby may be prevented even the case an amount of urine and feces is much, and since it is not necessary to cumulate the flooring material like a mountain on the floor, the manual work after the operation using the cutting machine becomes unnecessary and therefore this needs less labor forces, and an open/close operation of a partitioning member may be easily performed, And, when a underside of a concrete foundation is formed at the lower end of a floor, such underside may be utilized as the foundation in arranging facilities like the partitioning member and so on. And, such form is preferable in that it can be easily cleaned and washed even when the facility is cleaned by removing the flooring material.

Then, in the livestock raising facility, thickness of the flooring material varies according to average daily temperature in a livestock facility and about 60 cm or more is a preferred when such average temperature is about 20° C. or more to keep temperature suitable for absorption of urine and feces into the flooring material and fermentation with the mixed activated microorganism therein and to balance fermentation heat generated from the flooring material with temperature in the facility.

Further, in the livestock raising facility, thickness of the flooring material varies according to average daily temperature in a livestock facility and rate of about 10 cm per the temperature decrease of 5° C. is preferred to keep temperature and humidity suitable for fermentation of mixed activated microorganism in the flooring material irrelevant to a room temperature in the livestock raising facility and to balance fermentation heat generated from the flooring material with temperature in the facility.

Further, in the livestock raising method, when a operation of turning over the flooring material by a cutting machine is performed every one week to 10 days, oxygen Is sufficiently supplied into the flooring material to activate the microorganism, thereby, denaturation of urine and feces in a livestock into protein, fixation and solidification of such protein at the surface of and in the flooring material may also be prevented.

In the livestock raising method, when said turned over flooring material wherein egesta is fermented to decompose with the mixed activated microorganism and protein production process may provide a livestock as a feed, recycle system is established within a livestock and livestock raising form therefore are rationalized.

Further, in the livestock raising method, when thickness of the flooring material varies according to a average daily temperature in the livestock facility and about 60 cm or more is preferred when the average temperature in the livestock facility is about 20° C. or more to keep temperature and humidity suitable for absorption of urine and feces into the flooring material and fermentation of mixed activated microorganism in the flooring material, and to balance fermentation heat generated from the flooring material with temperature in the facility.

Further, in the livestock raising method, when a thickness of the flooring material varies according to a average daily temperature in the livestock facility and is increased by a rate of about 10 cm per the temperature decrease of 5° C., it is preferred in that temperature and humidity suitable for fermentation of mixed activated microorganism are obtained in the flooring material irrelevant to a room temperature in the livestock raising facility.

Further, in the livestock raising method, a waste food (garbage etc.) containing water and mixed activated microorganism and fermented to decompose by holding it at room temperature for about 24 to 36 hours in a fermentation tank is supplied into said feed box as a feed of a livestock, a waste food may usefully be utilized as a feed of a livestock and therefore this method becomes a preferred embodiment to reutilize the waste food.

Further, In the livestock raising method, when an amount of water to be added is adjusted, viscosity of a feed for a livestock is adjusted to allow to transfer them through a tube with pressure, and a feeding system is designed to supply the feed to the feedbox through a feed tube connected to the fermentation tank at a base end, labor force to directly supply a feed to each feedbox may be saved. Therefore, this method is a preferred embodiment and allows increasement of number of livestock to be raised per one operator.

Furthermore, in the livestock raising method, when there are seven to ten parallel lanes or an integral multiple of those lanes as a raising lane, this will be an preferable embodiment in turning over the flooring material in view of relation between intervals necessary for turning over the flooring material and a working cycle preferred for the operator.

BEST MODE FOR CARRYING OUT THE INVENTION

Figure 1:
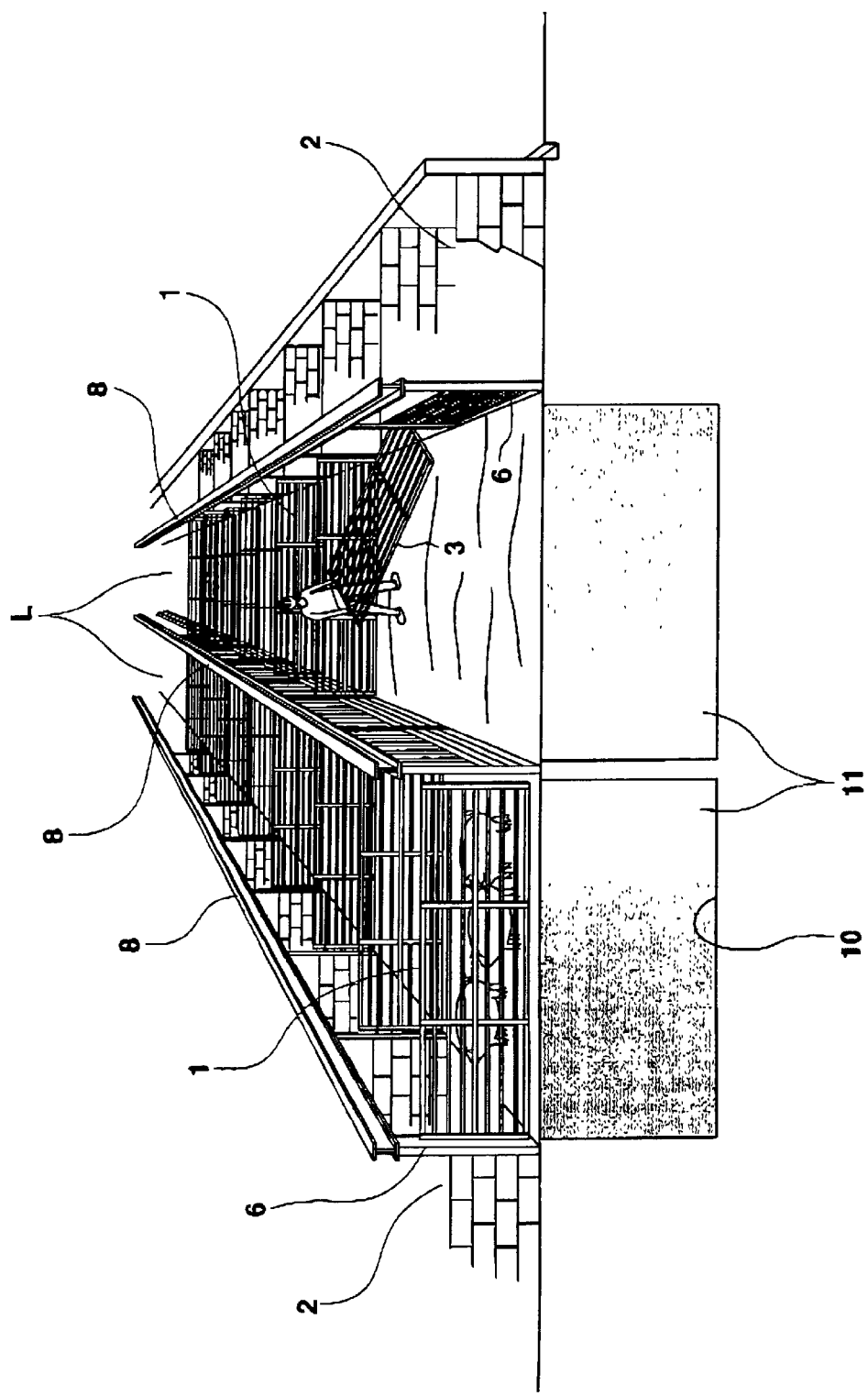
FIG. 1 is a perspective view showing a pigsty as an example on livestock raising facility according to the present invention.

Livestock raising facility and raising method according to the present invention will be described hereinafter by referring to the drawings on a pig raising facility and a pig raising method wherein the present inventor had actually performed.

Figure 2:
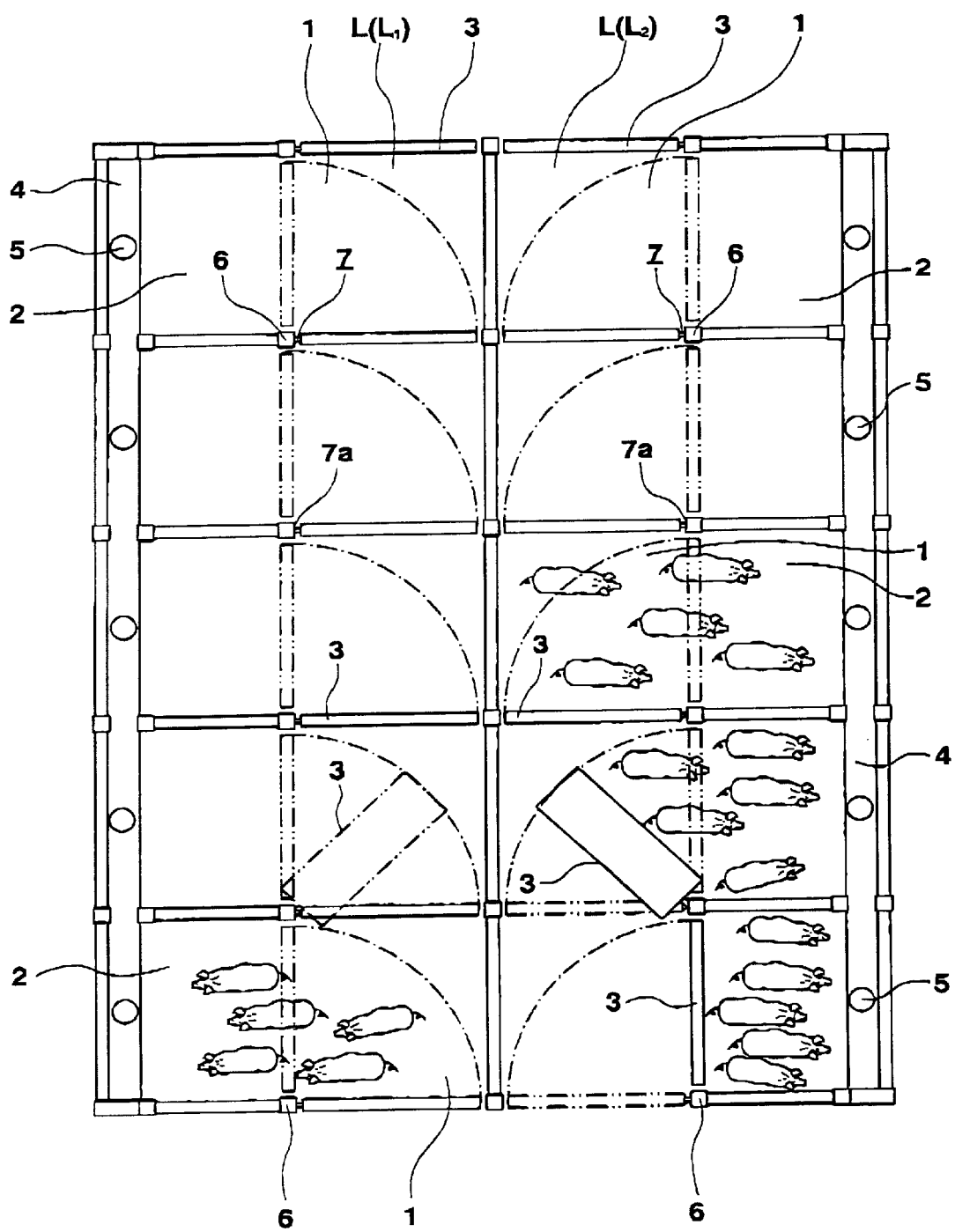
FIG. 2 is a plan view of the pigsty illustrated in FIG. 1.
Figure 3:
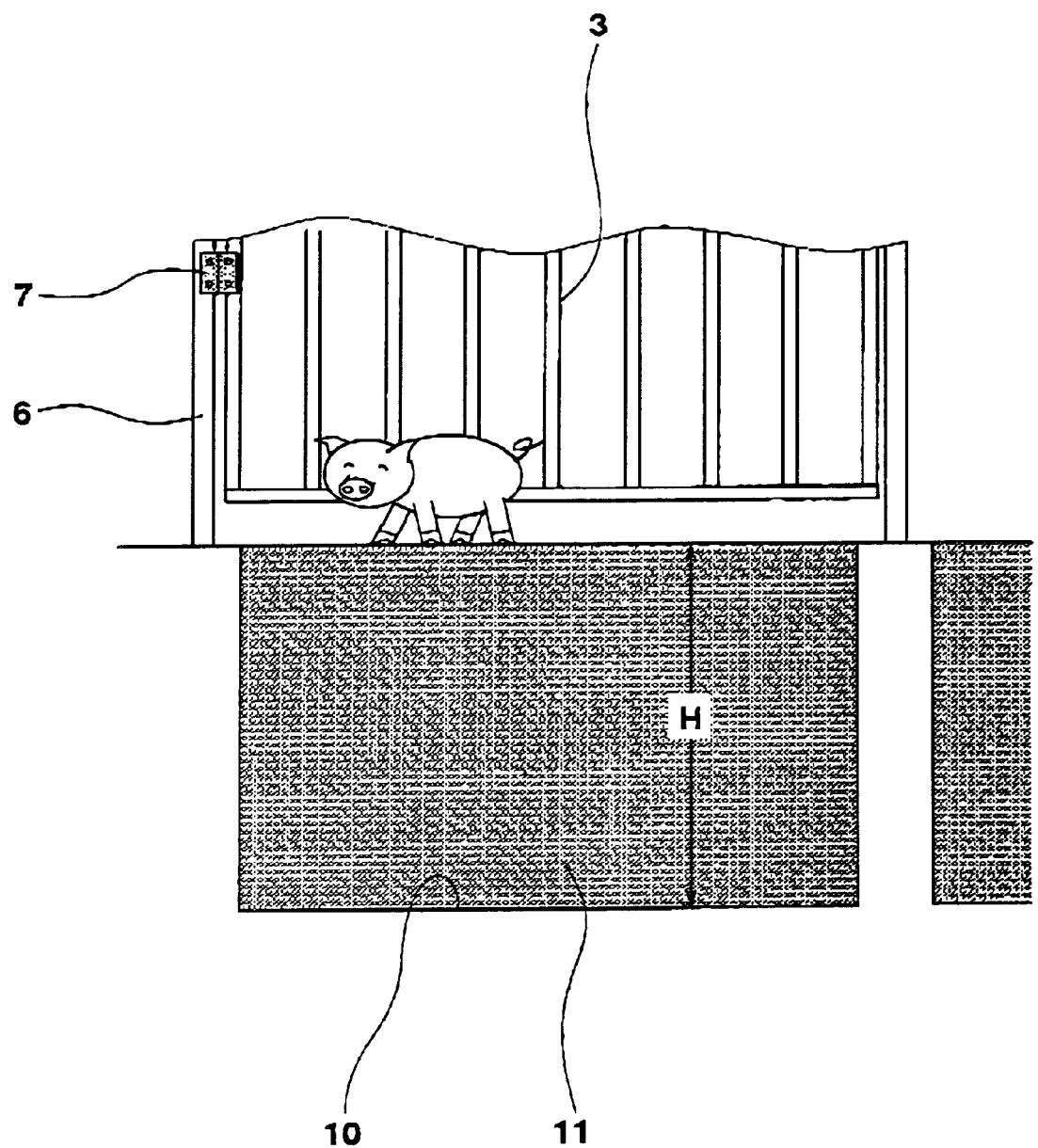
FIG. 3 is a sectional view taken along with line I—I in FIG. 2 showing laying state of the flooring material.

As illustrated in FIGS. 1 to 3, each raising space 1 divided by a partitioning member 3 is located longitudinally and arranged to form a single raising line. Particularly, in this example, this raising line is provided with two lines in parallel from side to side as illustrated in FIGS. 1 and 2.

Paddock 2 is formed on the side of each raising space 1. That is, in FIG. 2, paddock 2 is formed respectively to correspond to each raising space 1 on the left side of each raising space 1 of a raising line L1 on the left side, and paddock 2 is also formed respectively to correspond to each raising space 1 on the right side of each raising space 1 of a raising line L2 on the right side. And, a feedbox (feed line) 4 is formed consecutive to paddock 2 respectively on the side of each paddock 2, that is, on the left side of paddock 2 of a raising line L1 on the left side and also on the right side of paddock 2 of a raising line L2 on the right side, respectively. And each feedbox 4 is provided with feed tube 5 to supply a fluid feed (in sol form) from the above. Feed tube 5 is connected to a fermentation tank T indicated in FIG. 7 at its base end and designed to supply a feed to each feedbox automatically by operating an open/close valve. By the way, the raising space 1 is formed in a rectangular shape (a rectangle close to a square in this example) as horizontally viewed as illustrated in FIG. 2 and is divided from raising spaces 1 adjoining to and fro by the foregoing partitioning member 3 along the above raising line L. Ppartitioning member 3, as illustrated in FIG. 1 or 2, is attached to a column member 6 and provide vertically at the boundary between each raising space 1 and a paddock 2 at a horizontally swinging member 3A of the partitioning member 3 through the medium of a hinge metal fitting 7 (See, FIGS. 3 and 4) to swing freely round a vertical axis 7a of the hinge metal fitting 7 as illustrated in FIG. 2 and is designed to enable it to swing from a state indicated by a solid line to that indicated by a dotted line in FIG. 2 if necessary. A plurality of pipes 3a (three pipes in this example) are horizontally attached to the horizontally swinging member 3A at adequate intervals, and a rod 3b inserted into the pipe 3a to be retained is horizontally attached to a pale form member 3B. That is, the pale form member 3B is retained at center on the rod 3b in a state in which the pale form member 3B may be rotated (See, arrow in FIG. 4) round a horizontal axis 3c relative to a horizontally swinging member 3A and is designed to restrain the rotating motion of a pale form member 3B by a metal tic-down not shown. Therefore, when the metal tie-down is released and a horizontally swinging member 3A is rotated in the direction of the arrow R in FIG. 4 to swing a partitioning member 3 round the vertical axis 7a, the partitioning member 3 may be swung to the direction indicated by the arrow S round the above vertical axis 7a with the pale form member 3B inclined round the horizontal axis 3c, and therefore is designed to enable it to swing round a vertical axis 7a without a hitch even in the case that there are bumps and dips on a floor (See, FIG. 1). Further, a pectination member 3C is attached to the pale form member 3B of the partitioning member 3 to project downward and receive within the pale form member 3B. That is, there are horizontally swinging member 3A attached on one side of the pale form member 3B and the pectination member 3C attached on the other side, respectively.

Traveling rail 8 is provided on both sides of each raising space 1, respectively, along each raising line L at the height of about two meter from the floor level, therefore traveling rails 8 of three lines are provided in total as illustrated in FIGS. 1 and 2. Cutting machine M indicated in FIGS. 5 and 6 may be traversed on the traveling rail 8.

In this example, there are traversors (equipments for traversing) which carry the cutting machine M in the lateral direction to position one cutting machine M at each raising line L in such a way that the cutting machine M may be selectively traversed longitudinally on the both raising lines L provided in parallel.

As illustrated in FIG. 3 as an enlarged view, a concrete underside 10 is laid at the position of about 70 cm in depth (See, "H" in FIG. 3) in each foregoing raising space 1 and a flooring material 11 is placed in thickness of about 60 to 70 cm on the underside 10.

The flooring material 11 is initially composed of a carbonen substrate such as sawdust, straw, chaff, stick, a wood cortex. woodchip, bark, duct and the like, which is mixed with the mixed activated microorganism (available from FUKUNAGA MICROORGANISM INSTITUTE K. K. (at 2705 Funatsu-cho, Himeji-shi, Hyogo, Japan)) at a mixing rate of 400 g/3.3 m$^2$ and is adjusted in water content to be 70% in humidity.

The mixed activated microorganism is a mixed microorganism containing a aerobic soil microorganism which may utilize materials rich in a carbonen substrate such as sawdust, straw, chaff, stick, a wood cortex, woodchip, bark, duct and the like as a carbon source and shows an excellent decomposition and recycles materials composing organic waste. Further, analytical examples on composed species in the mixed activated microorganism are noted at the end of this section of the specification.

Figure 5:
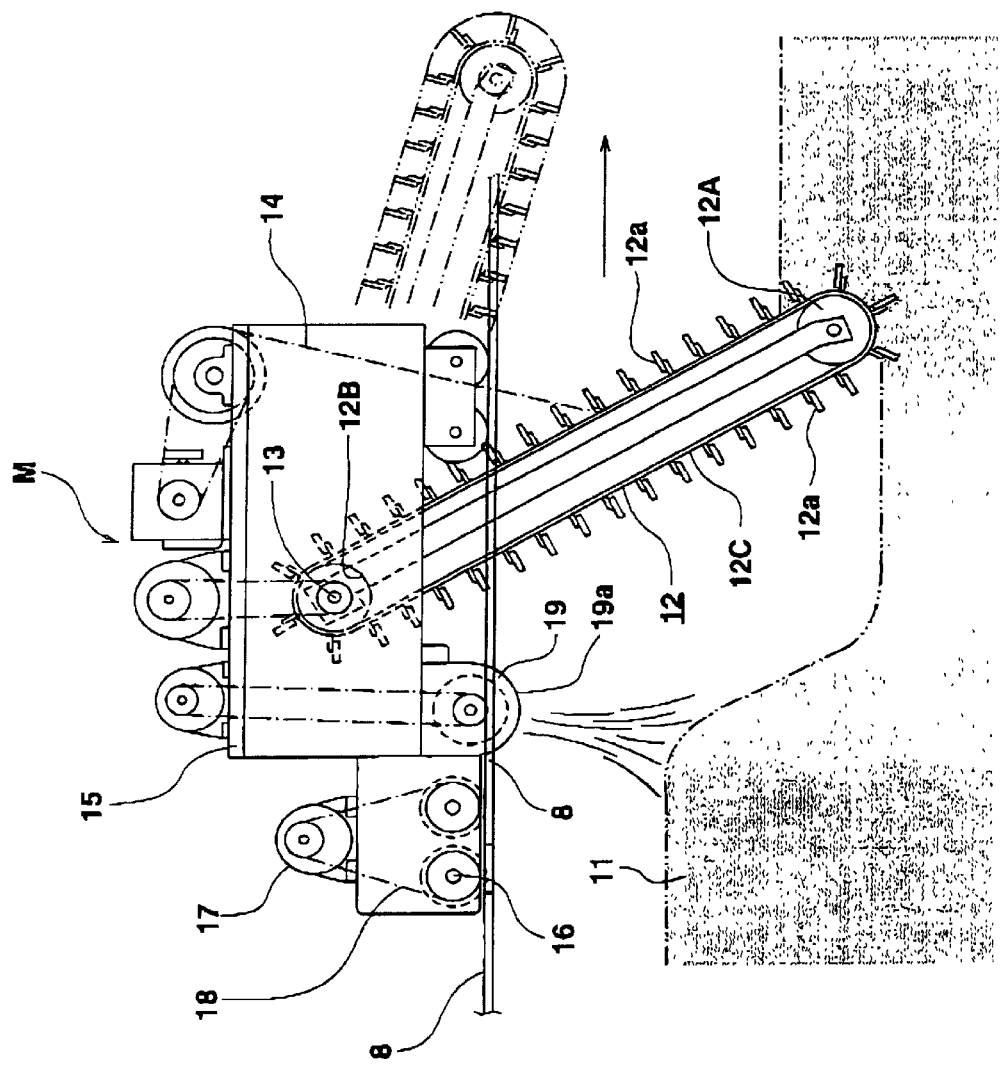
FIG. 5 is a side view showing a self-propelled cutting machine for turning over the flooring material of the pigsty illustrated in FIG. 1.
Figure 6:
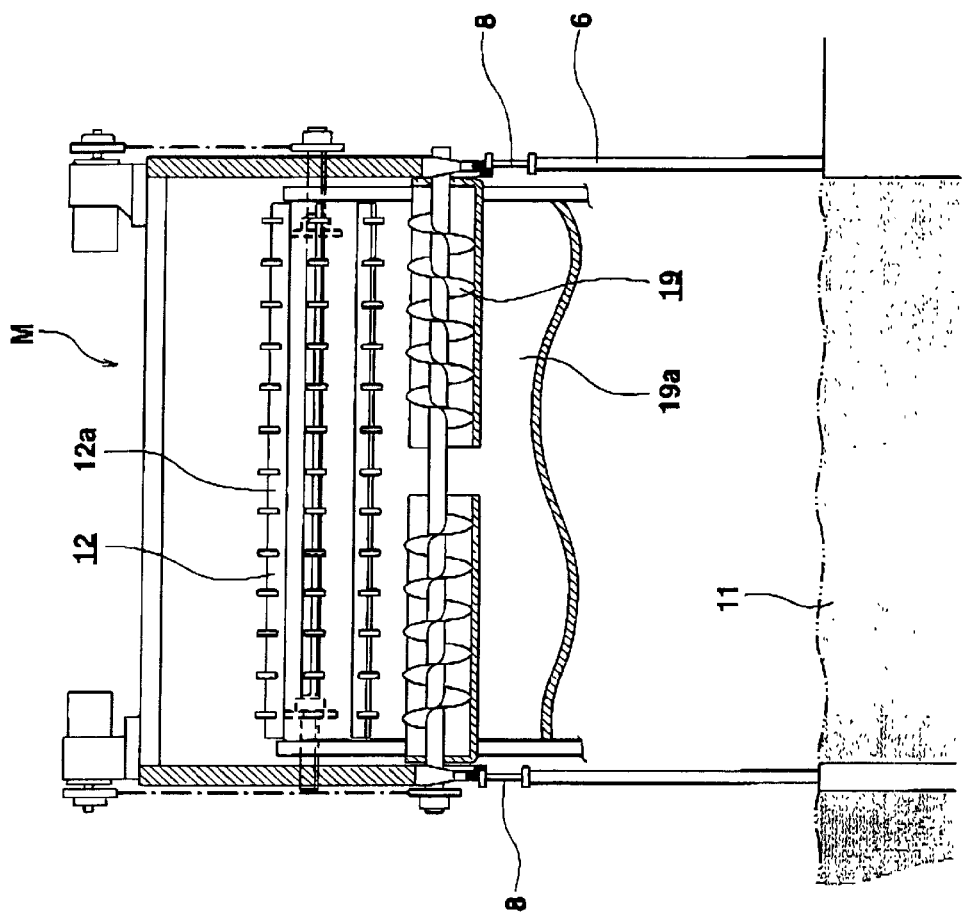
FIG. 6 is a front view showing a self-propelled cutting machine illustrated in FIG. 5.

Further, the cutting machine M is essentially similar to the machine disclosed in the aforenoted patents owned by the present inventor. That is, a cutting member 12 in which an endless belt element 12C, installed laterally with a flat bar shaped projection 12a square to the direction of the rotation with an adequate intervals on the surface, is wind round a sprocket between sprockets 12A and 12B located at both sides is designed to swing up and down round a pivot shaft 13 from a state indicated by a solid line to that indicated by a dotted line relative to a frame 15 by hoisting and lowering a front end of the cutting member 12 by a hoist wire 14 as illustrated in FIG. 5, FIG. 6. And, this machine is designed in such a way that the cutting machine M may be traversed on a traveling rail 8 by driving a drive wheel 16 attached to a lower end of the frame 15 through the chain 18 by a traveling motor 17 located above the drive wheel 16. Further, the cutting machine M equipped with cutting apparatus 19 in a screw form, having a discharge outlet 19a at the low side, which is used to comminute a flooring material 11 carried upward by the cutting member 12 and to discharge it downward under contacting the flooring material 11 with the ambient atmosphere in turning over the flooring material 11 and is designed to comminute the flooring material 11 falling from a lower side of a top end of the cutting member 12 and to discharge it from the discharge outlet 19a in the lower side under contacting it with the ambient atmosphere.

Figure 7:
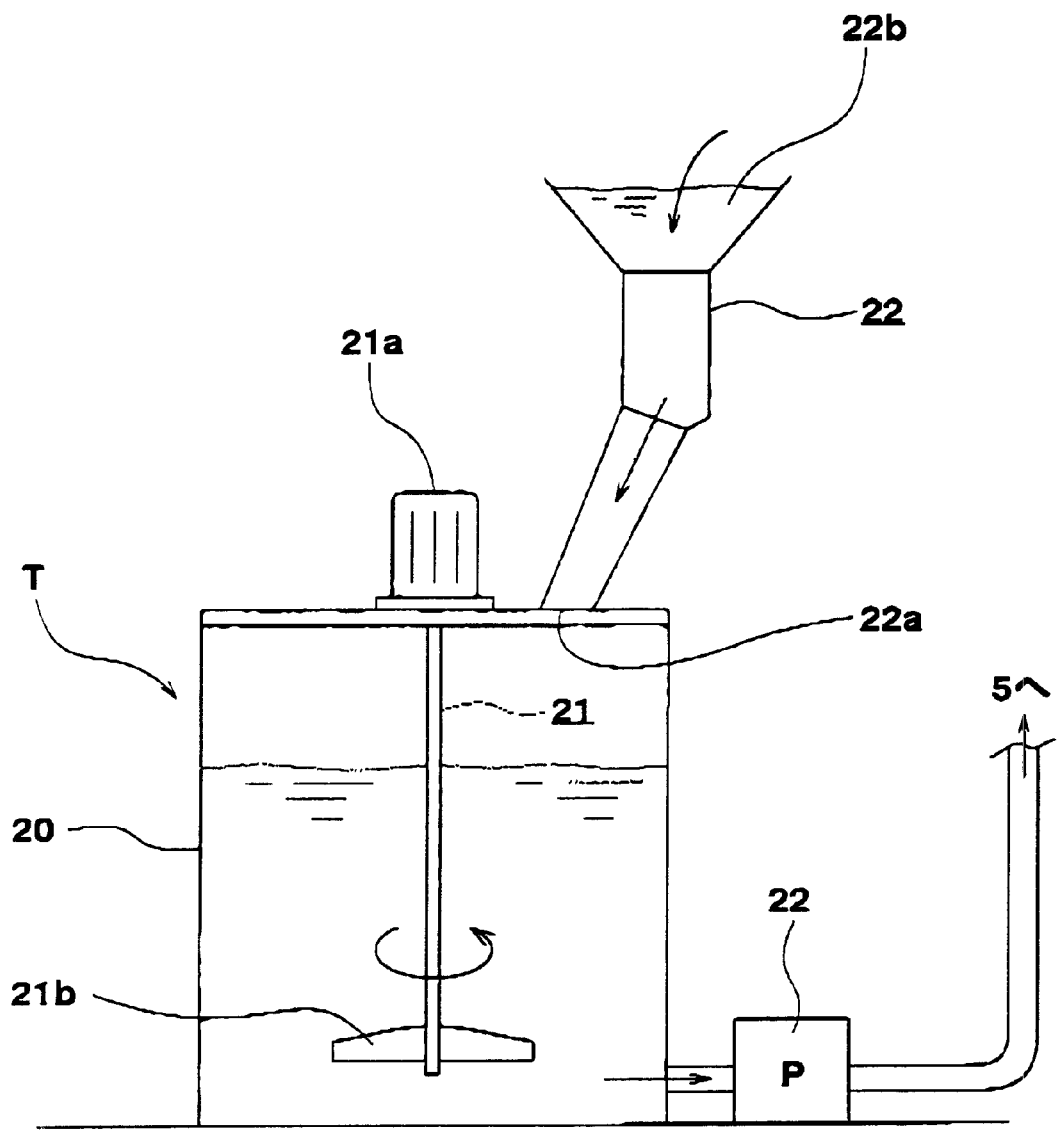
FIG. 7 is a schematic view showing a fermentation tank.

On the other hand, as illustrated in FIG. 7, the tank is composed of a tank body 20, an agitating apparatus 21 in which a motor 21a is located on a top end of the tank 20 and a agitating blade 21b is positioned in the tank 20, a pump P for transferring with pressure connected to a bottom portion of the tank body 20 thorough a tube which is located near the bottom portion of the tank body 20 and a comminuting apparatus 22 equipped with a discharge outlet 22a at the upper open location of the tank body 20 and comprising a charging inlet 22b for food waste at a upper end. When food waste is charged into the charge inlet 22b of the comminuting apparatus 22, the food waste is comminuted to bits and the comminuted food waste is discharged from the discharge outlet 22a and is received in the tank body 20. The comminuted food waste received in the tank body 20 is added with water and the foregoing mixed activated microorganism, fermented at room temperature for about 24 to 36 hours (required for more time as ambient temperature decreases) and transferred to a feedbox 4 through the feed tube by pressuring with the pump P. The water is added by an amount required for diluting the food waste after fermentation to get the viscosity to allow the food waste after fermentation to be transferred by pressuring with the transfer pump. Therefore, the water rate varies according to the waste food brought therein. And, an amount of the mixed activated microorganism added varies with a season, i.e., a summer season when a material is putrescible and a winter season when it is hard putrescible and the degree of freshness (the degree of putrefaction) and the kinds of the food waste brought theein, and the specific addition rate of the mixed activated microorganism is 1 to 50 Kg per amount of 1000 kg treated waste food in the tank body 20. That is, when the degree of freshness is low, the amount of the mixed activated microorganism added is increased according to the degree. In a summer season, the mixed activated microorganism is added a little more than in a winter season.

Then, the livestock raising facility (a pigsty in this example) designed as described above is managed as follows with respect to the raising of livestock (a pig in this example). Hereinafter, a raising method of livestock (a pig) will be described together with the effects of the facility.

That is, a flooring material 11 prepared by adding the mixed activated microorganism to sawdust, straw, chaff, stick, a wood cortex, woodchip, bark, duct and/or a mixture (carbon source) selected from these materials and adjusted in water content to be about 70% is previously placed in thickness of 60 to 70 cm on the concrete underside 10 in the raising space 1 of the pigsty as illustrated in FIGS. 1 and 2. Therefore, it becomes optimal condition on temperature and humidity in the flooring material 11 for an activity of the mixed activated microorganism. Specifically, it becomes 40° C. in temperature and 70% in relative humidity. Therefore, recycling and decomposing of a carbon source such as the sawdust or the like by the mixed activated microorganism is promoted vigorously within the flooring material 11.

One to two pig(s) is/are raised per 1 m$^2$ in a floor area on such a flooring material 11 as illustrated in FIGS. 1 to 3. That is, since pigs exercise on the flooring material 11 and egest thereon, urine and feces therefore permeates into the flooring material 11 and naturally including the smell of urine and feces, but any bad smell such as harmful gas does not generate and maggot also does not appear because the mixed activated microorganism digests vigorously inside as described above. Therefore, there is no flies on the surface of the flooring material 11. Since the flooring material 11 has thickness of 60 to 70 cm as described above and one to two pig(s) is/are raised Per 1 m$^2$ in a floor area, and in view of the relation between the amount of the urine and feces and the absorbing volume of the flooring material, urine and feces are not spilled downwards from the flooring material 11. Particularly, since the underside is formed with concrete in the example, soil contamination is protected perfectly.

Flooring material 11 is sprayed with water at adequate intervals and humidity and temperature is adjusted to be about 70% in relative humidity and 40° C. in temperature within the flooring material 11.

Fluid feed (in sol form) made from the waste food is supplied adequately from the tank T through the feed tube to the feedbox 4 formed on a side of the paddock 2 combined with the each raising space 1 into single space. This feed may be easily supplied by simply opening by an operator a feed valve located at the feed tube above the feedbox 4.

Figure 4:
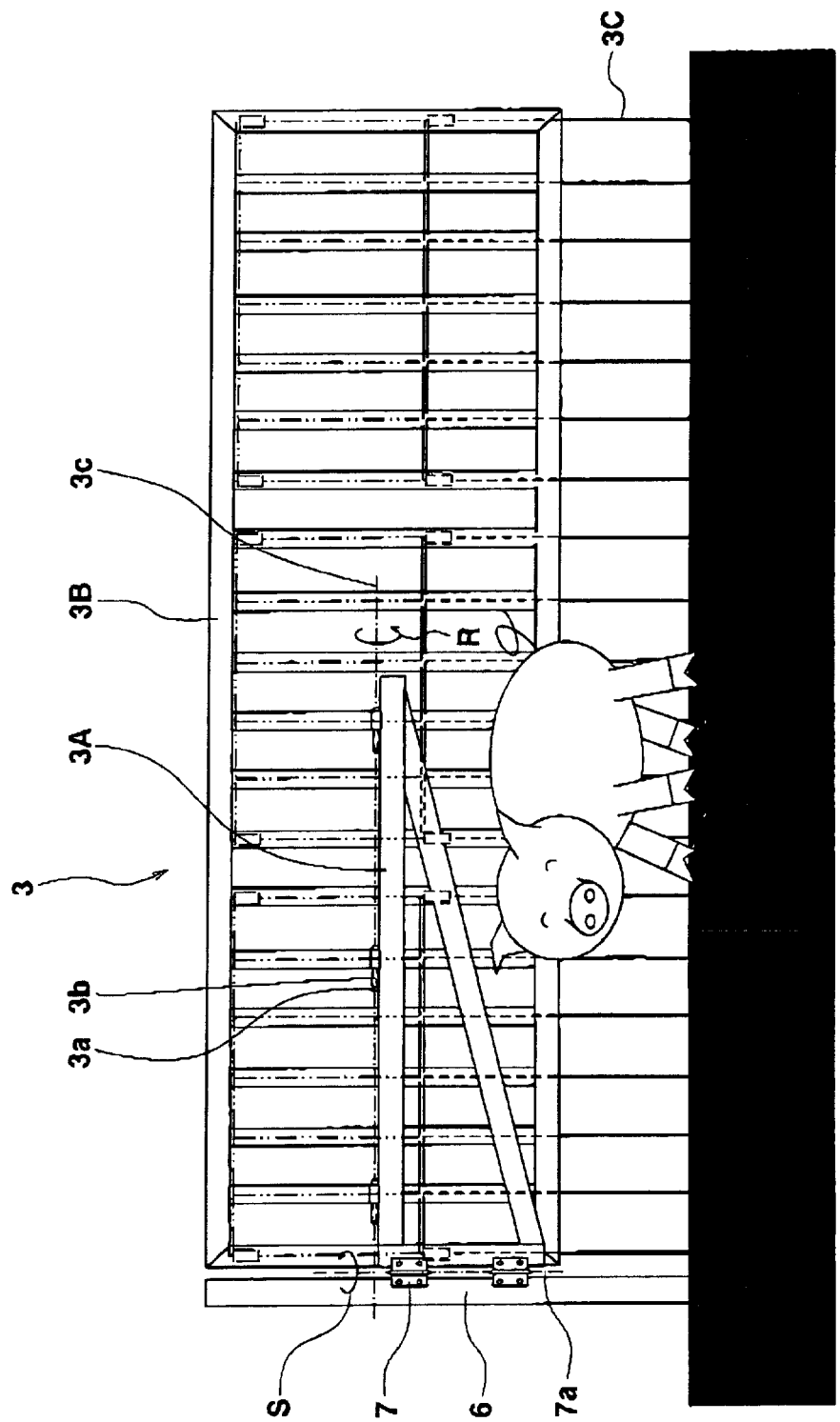
FIG. 4 is a schematic partial enlarged view showing a partitioning member illustrated in FIGS. 1 and 2.

As noted above, when a pig is raised on the flooring material 11 for one week to ten days, urine and feces are permeated into the flooring material 11 and fermentation and decomposition are promoted inside during that period. In this condition, at first, a pectination member 3C shown in FIG. 4 is lifted upward to be received in a pale form member 3B and, then, when the partitioning member 3 illustrated in FIGS. 1 and 2 is swung round the vertical axis 7a of the hinge metal fitting 7 in such a way that the front end of the partitioning member 3 positions on the side of the paddock 2, a pig is driven by themselves with the partitioning member 3 from the raising space 1 into the paddock 2. In this operation, when the partitioning member is swung with the pale form member 3B rotated round the above horizontal axis 3C if necessary, a pig may be driven without a hitch even if there are bumps and dips on a floor and a pig is prevented from escaping (to the raising space 1 in this case) from the lower portion of the partitioning member 3 by lowering the pectination member 3C downward after swinging the partitioning member. In this operation, when a feed is previously shorted a little and is supplied in this swing operation, it becomes more easy to perform the operation since a pig moves from the raising space 1 into the paddock 2 by itself being invited by the feed.

Thereby, the raising line L is combined into single space by swinging the partitioning member 3 dividing the raising space 1 as described above one after another in a raising line L, for example, in FIG. 1 from this side toward the back of the line. With respect to labor forces, time required to perform this operation by one person is approximately 1 to 2 minutes per one raising space.

When the raising line L is combined into single space as noted above, the cutting machine M is carried from the waiting position of the cutting machine M by the traverser not shown in such a way that the cutting machine M is positioned on the travelling rails 8 on both sides of the raising line L and this machine turns over the flooring material 11 of each raising space 1 forming the raising line L from the surface to the bottom. Fresh carbon source is added and the mixed activated microorganism is mixed additionally at a mixing rate of 400 g/3.3 m$^2$ during the cutting operation. And, in this operation, the water content is adjusted to be about 70% in the relative humidity within the flooring material 11 if necessary.

Such addition of carbon source is performed to supplement a portion reduced by pig's intake of protein made by permeating urine and feces into a carbon source fermented, decomposed and laid on the underside as noted above.

This turning over operation requires 30 seconds per one raising space and therefore this operation is completed within a time of 3 to 4 minutes when one raising line L is provided with five raising spaces 1.

After the turning over operation is completed, on the contrary to the above procedure, the partitioning member 3 dividing the raising space 1 on the most back side is swung round the vertical axis 7a of the hinge metal fitting 7 and is returned to the state in which the partitioning member 3 divides from the adjoining raising space 1 on this side in FIG. 1 and 2 and thereby a pig driven in the paddock 2 enters the raising space 1 again and is raised in the space unified with the raising space 1 and the paddock 2.

Thus, the forward partitioning member 3 is, one after another, returned to the initial position and the raising facility is also returned to the state antecedent to the turning over operation.

Also, the turning over operation is performed on the adjoining raising line L at the intervals of one week to ten days.

Since driving a pig from the raising space 1 into the paddock 2 and turning over may be performed in a exceedingly short time as described above, and the feed may be supplied to the feedbox 4 by simply opening the feed valve of the feed tube and, in addition, any disposal of a pig's egesta is not required, the necessary labor forces to raise a pig may be reduced remarkably.

Specifically, according to the test in the experimental pig raising facility of the present inventor, 5,000 pigs can be raised by only three operators.

And, there are no elections of urine and feces (egesta) from the pigsty and any bad smell does not generate and flies does not appear, environmental disruption is therefore not developed in its surroundings.

Further, since a pig is raised with the clean floor and on the flooring material fermented and decomposed by a mixed activated microorganism contributing to promote the pigs' good health, pigs grow in a healthy state without stress. Particularly, since a pig eats sawdust, straw, chaff, stick, a wood cortex, woodchip, bark, duct and/or the like of being the carbon source even in a state antecedent to those decomposed, pig's intestines become thicken and a pig is raised in a very vigorous state by a effect of those fibers. Particularly, it is found that it is effective to increase the amount of the mixed activated microorganism added to the flooring material rather more, for example, 1.5 to 2 times larger that the usual amount for preventing an infectious disease from spreading in this pigsty.

In view of the operation efficiency in the pigsty, the raising line L is preferably provided in conformity with turning over operation cycle, i.e., with seven to ten lanes and the length of one raising line is preferably designed to the length of 50 to 100 raising spaces, Incidentally, though the present invention has been described taking a pig as a livestock and a pigsty as a livestock raising facility, respectively in the above example, the present invention may also be applied to cattle, horse, sheep, deer and the like and may offer the similar effects.

With respect to large livestock such as cattle, horse and the like, it is preferred in light of environmental issue that the paddock is same form to the raising space, then the livestock raising facility is designed to raise such livestock in one space during turning over operation in the other space.

Examples on Analysis of Species In Mixed Activated Microorganism

To identify species of bacterium, fungus, actinomyces and yeast in the mixed activated microorganisms, various kinds of isolation culture mediums having compositions noted in the following Table 1 were prepared, and each culture medium was inoculated with the mixed activated microorganism.

TABLE 1

[Bacterium Isolation Culture Medium: bouillon agar medium]

| | |
|---|---|
| Meat extract | 10 g |
| Peptone | 10 g |
| Sodium chloride | 5 g |
| Agar | 20 g |
| Distilled water | 1000 ml |
| pH of Medium | 7.2 |

[Fungus Isolation Culture Medium: malt extract agar medium]

| | |
|---|---|
| Malt extract | 20 g |
| D-glucose | 20 g |
| Peptone | 1 g |
| Agar | 20 g |
| Distilled water | 1000 ml |

[Actinomyces Isolation Culture Medium: sucrose-nitric acid agar medium]

| | |
|---|---|
| Sucrose | 30 g |
| $NaNO_3$ | 2 g |
| $K_2HPO_4$ | 1 g |
| $MgSO_4 \cdot 7H_2O$ | 0.5 g |
| Potassium chloride | 0.5 g |
| $FeSO4.7H_2O$ | 0.01 g |
| Agar | 20 g |
| Distilled water | 1000 ml |
| pH of Medium | 7.0 to 7.3 |

[Yeast Isolation Culture Medium: MY medium]

| | |
|---|---|
| Peptone | 5 g |
| Yeast extract | 3 g |
| Malt extract | 3 g |
| D-glucose | 10 g |
| Distilled water | 1000 ml |

Colonies in petri dishes appeared through stepwise dilution were taken and employed as a test strain for identification.

Further, species of bacterium, fungus, actinomyces and yeast were identified according to the classification rules noted in Table 2.

TABLE 2

| | |
|---|---|
| Bacterium: | Bergey's Manual of Determinative Bacteriology (8th edition, 9th edition) |
| Yeast: | The yeasts a taxonomic study (Kreger-van Rij) |
| Fungus/Actinomyces: | The Fungi IVA, The Fungi IVB, An Illustrated Guide to Fungus (1st volume), An Illustrated Guide to Fungus (2nd volume), The classification and identification of microorganism |

Principal species of bacterium, fungus, actinomyces and yeast in the mixed activated microorganisms isolated and identified by the above procedures are listed in the following Table 3.

TABLE 3

| | |
|---|---|
| Bacterium: | Bacillus subtilis |
| | Bacillus stearothermophilus |
| | Clostridium thermocellum |
| Fungus: | Aspergillus oryzae |
| | Aspergillus niger |
| | Aspergillus fumigatus |
| | Chactomium thermophile |
| | Humicola lanuginosa |
| | Rhizopus javanicus |
| Yeast: | Candida glabraca |
| | Debaryomyces hansenii |
| | Hansenula anomala |

TABLE 3-continued

|  |  |
|---|---|
|  | Pichia membranaefaciens |
|  | Rhodotorula glutinis |
|  | Saccharomyces Cerevisiae |
| Actinomyces: | Actinobifida dichotom |
|  | Streptomyces griseus |
|  | Streptomyces thermophilus |
|  | Thermoactinomyces vulgaris |
|  | Thermomonospora glaucus |

INDUSTRIAL APPLICABILITY

Accordance to the present invention, in a livestock raising facility and a livestock raising method, necessary labor forces can be reduced remarkably in comparison with the conventional method, and energy conservation may also be realized because the thermal source such as a heater and the like is not necessary for fermenting and decomposing urine and feces.

Since any urine and feces (egesta) are not ejected, soil will not be contaminated in a livestock raising facility and its surroundings.

Then, since the present invention changes the flooring material in a raising space into the feed and it had never been proposed and may realize recycling usage, unpredictable livestock raising facility and raising method may also be provided.

What is claimed is:

1. A livestock raising facility equipped with a cutting machine positioned to move freely over a raising line to agitate a base and surface of a flooring material containing a carbonaceous substrate selected from the group consisting of sawdust, straw, chaff, stick, a wood cortex, woodchips, bark, duct and a mixture thereof, and a mixed activated microorganism offering a fermentative decomposition action, and a raising line having a plurality of raising spaces divided into a predetermined area with one or more consecutive partitioning members together with a paddock consecutive to each raising space on the sides of the raising space, the each raising space is formed in a rectangular shape as viewed from horizontally, and the partitioning member is attached by a hinge member to one end of a boundary between each raising space, and the paddock is formed consecutive to the raising space to swing freely around a vertical axis from a state of providing a partition between the raising space and the paddock to that of providing a partition between a rearing space and an adjoining rearing space, wherein the partitioning member is attached by the hinge member to swing freely around a horizontal axis.

2. The livestock raising facility according to claim 1, wherein said paddock is substantially the same as the raising space.

3. A livestock raising facility equipped with a cutting machine positioned to move freely over a raising line to agitate a base and surface of a flooring material containing a carbonaceous substrate selected from the group consisting of sawdust, straw, chaff, stick, a wood cortex, woodchips, bark, duct, a mixture thereof, and a mixed activated microorganism offering a fermentative decomposition action, and a raising line having a plurality of raising spaces divided into a predetermined area with a partitioning member consecutively together with a paddock consecutive to each raising space on the sides of the raising space wherein a floor is formed on a concrete foundation and the thickness of the flooring material is at least 60 cm; and the mixed activated microorganism is from the group consisting of one or more of the following listed species:

|  |  |
|---|---|
| Bacterium: | Bacillus subtilis |
|  | Bacillus stearothermophilus |
|  | Clostridium thermocellum |
| Fungus: | Aspergillus oryzae |
|  | Aspergillus niger |
|  | Aspergillus fumigatus |
|  | Chactomium thermophile |
|  | Humicola lanuginosa |
|  | Rhizopus javanicus |
| Actinomyces: | Actinobifida dichotom |
|  | Streptomyces griseus |
|  | Streptomyces thermophilus |
|  | Thermoactinomyces vulgaris |
|  | Thermomonospora glaucus |

4. The livestock raising facility according to claim 3, wherein said thickness of the flooring material varies according to average daily temperature in the livestock facility and is about 60 cm to 70 cm when the average daily temperature in the livestock facility is at least about 20° C.

5. The livestock raising facility according to claim 3, wherein said thickness of the flooring material varies according to an average daily temperature in the livestock facility and is increased from a thickness of 60 cm to 70 cm at 20° C. by a rate of about 10 cm for each incremental livestock facility temperature decrease of 5° C.

6. A method of raising livestock comprising the steps of:

layering floor material containing a carbonaceous substrate selected from the group consisting of sawdust, straw, chaff, stick, a wood cortex, woodchips, bark, duct, a mixture thereof, and a mixed activated microorganism offering a fermentative decomposition action on egestra, forming a raising line by installing a plurality of raising spaces divided into a predetermined area by one or more consecutive partitioning members, forming a paddock consecutive to each raising space on the side of the raising space, forming a feedbox at an end portion of a side opposite to a raising space of the paddock or an end portion of a side opposite to the paddock of the raising space, agitating the flooring material with a flooring material cutting machine located to move freely over the raising line above raising space, traversing a cutting machine longitudinally along a raising line formed by installing a raising space consecutively under the absence of livestock in each raising space by driving the livestock from the raising space into the paddock at predetermined intervals to agitate a flooring material to form a new flooring material to raise a livestock thereon, wherein the raising space and the paddock are formed in the substantially same size and in a rectangular shape as viewed from horizontally, one end of a partitioning member for dividing from the adjoining raising space is supported by a hinge member allowing the partitioning member to swing round a vertical axis at the boundary between a raising space and a paddock and allowing it to swing around a horizontal axis, so that the livestock in the raising space is driven under turning over operation into the paddock on the side of the raising space by swinging the partitioning member around the vertical axis of the hinge portion and, if necessary at that time, swinging it around a horizontal axis, and the cutting machine is traversed along the raising line as one space formed by installing a raising space consecutively to turn over the flooring material, after the turning over operation, the livestock is returned from the paddock into the raising space by swinging the partitioning member around the vertical axis of the hinge portion and, if necessary at that time, swinging it around a horizontal axis.

7. The livestock raising method according to claim 6, wherein said turning over of the flooring material by said cutting machine is performed every one week to ten days.

8. The livestock raising method according to claim 6, wherein said cut flooring material is given to the livestock as a feed.

9. The livestock raising method according to claim 6, wherein said thickness of the flooring material varies according to an average daily temperature in the livestock facility and is at least about 60 cm when the average daily temperature in the livestock facility is at least about 20° C.

10. The livestock raising method according to claim 9, wherein said thickness of the flooring material varies according to an average daily temperature in the livestock facility and is increased by a rate of about 10 cm for each incremental livestock facility temperature decrease of 5° C.

11. The livestock raising method according to claim 6, wherein livestock feed is provided in the livestock facility by adding water and the mixed activated microorganism to a waste food and fermenting to decompose by holding it at room temperature for about 24 to 36 hours in a fermentation tank, and supplying said food into said feedbox.

12. The livestock raising method according to claim 11, further including the step of adjusting a viscosity of the feed for the livestock by adjusting an amount of water addition so that the feed has a viscosity sufficiently low to be pressure supplied to said feedbox through a tube connected to the fermentation tank at a base end thereof.

13. The livestock raising method according to claim 6, as said raising line, there are seven to ten parallel raising spaces or an integral multiple thereof.

* * * * *